Sept. 5, 1933.  V. G. APPLE  1,925,892
DYNAMO ELECTRIC MACHINE ELEMENT
Filed Oct. 13, 1930  2 Sheets-Sheet 1

INVENTOR

Sept. 5, 1933.  V. G. APPLE  1,925,892
DYNAMO ELECTRIC MACHINE ELEMENT
Filed Oct. 13, 1930  2 Sheets-Sheet 2
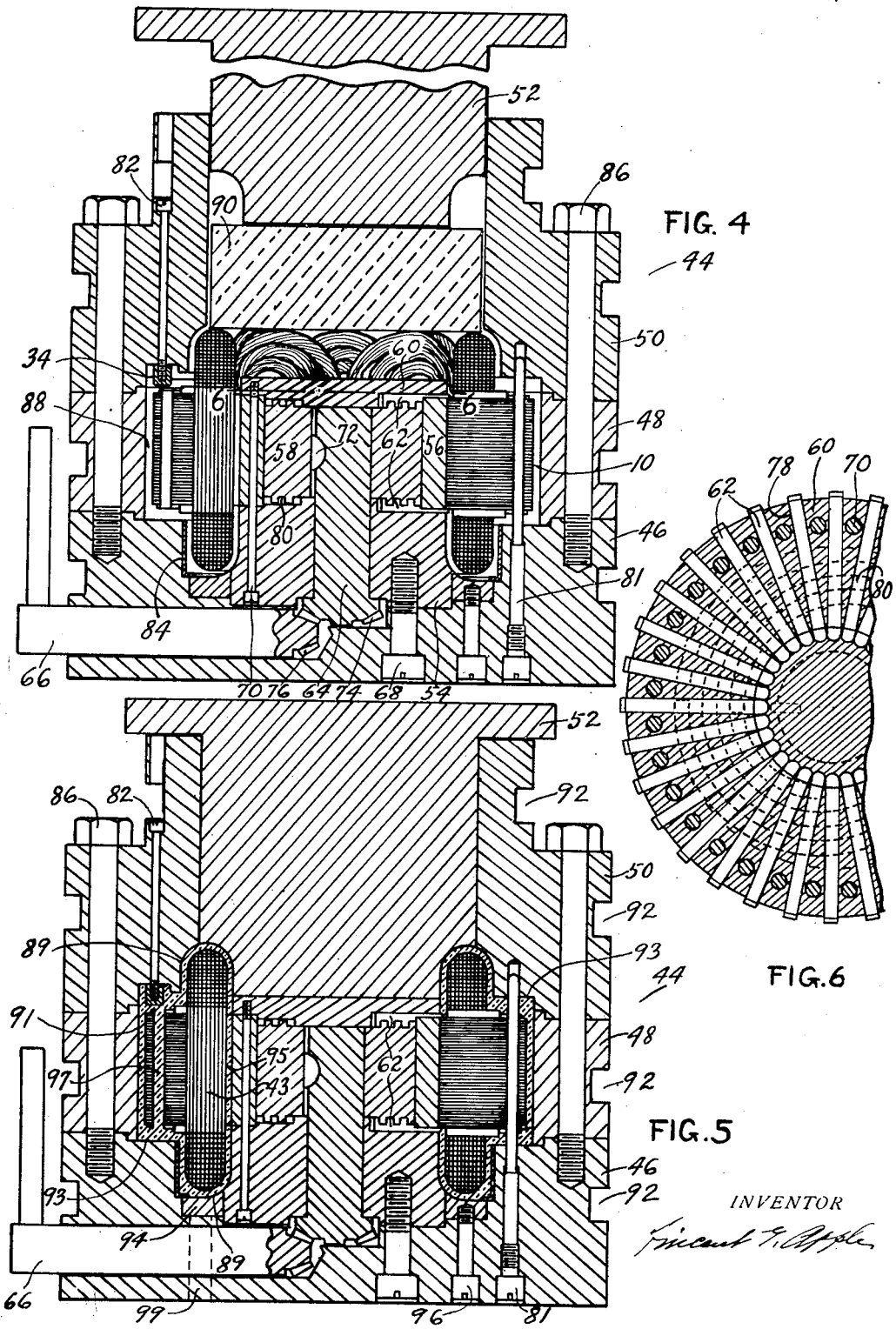

Patented Sept. 5, 1933

1,925,892

UNITED STATES PATENT OFFICE 1,925,892

DYNAMO ELECTRIC MACHINE ELEMENT

Vincent G. Apple, Dayton, Ohio; Herbert F. Apple, Edward M. Apple, and Gourley Darroch, executors of said Vincent G. Apple, deceased Application October 13, 1930. Serial No. 488,379

2 Claims. (Cl. 172—36)

This invention relates to dynamo electric machine elements wherein the core and windings are imbedded in and completely surrounded by a mass of insulation which forms a protective casing for the element.

The object of the invention is to provide a dynamo electric machine element which is particularly adapted to motors which are intended to be used in situations where they are subject to the action of oil, moisture and corrosive gases, as where a motor is employed in mechanical refrigerating mechanism, or in the pumping of corrosive materials or the like, in which situations conventionally wound motor elements are extremely short lived.

As an illustrative embodiment I show a two phase alternating current stator, though it is of course understood that the invention applies equally to direct current fields or other wound elements. In the drawings, Fig. 1 is a perspective view of a stator core with the windings in place.

Fig. 4 shows the core and coils assembly in a mold ready to have the mass of insulation composing the protective casing molded thereabout.

Fig. 5 shows the mold closed and the protective casing of insulation formed completely around the core and to completely enclose the windings.

Fig. 6 is an enlarged transverse section taken at 6—6 of Fig. 4.

Similar numerals refer to similar parts throughout the several views.

Figure 1:
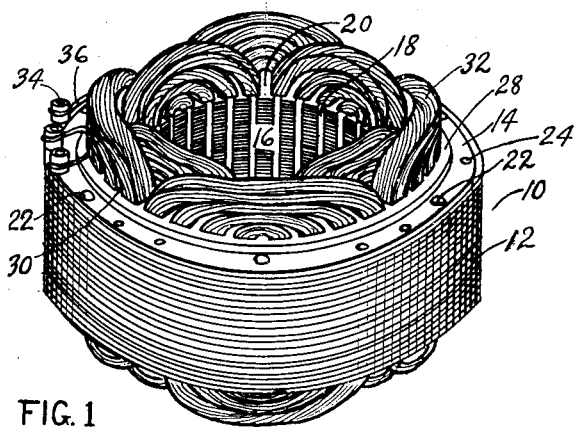

The core 10 is made up of a plurality of thin laminæ 12 with heavier metal end rings 14 at the ends of the core. The large central opening 16 has a circular row of winding slots 18 surrounding it. The winding slots 18 are separated by teeth 20. The metal end rings 14 are thicker than the laminæ 12 but not quite so large in diameter. Rivets 22 hold the laminæ and end rings together. Midway between rivets 22 are a series of holes 24, some of which at a subsequent operation hereinafter described fill with insulation which adds to the means tending to hold the laminæ together. The winding slots 18 are preferably lined with some suitable sheet insulation as at 26, Fig. 3, before the winding is put on the core. A heavy washer 28 of insulation has teeth 30 extending inwardly between adjacent slots. (See Fig. 1).

In the winding I employ insulated magnet wire preferably of the kind having a cotton or other porous covering, and, by saturating and coating the covering with fluid insulation before winding it into the coils the individual turns of the coils are more widely separated by insulation. A convenient method of so coating wire and winding it into coils is shown and described in my copending application Serial No. 430,864, filed February 24th, 1930, but other coating methods may be pursued if desired, or the older method of first winding the wire into coils and afterward impregnating the coils with liquid insulation may be employed where the pressure incident to the subsequent molding operation is not too great. Fig. 1 shows the coil ends 32 as arranged for two phases, with the tapped metal winding terminals 34 extending unsupported except that they are attached to relatively heavy wires 36 emanating from the coils.

Figure 2:
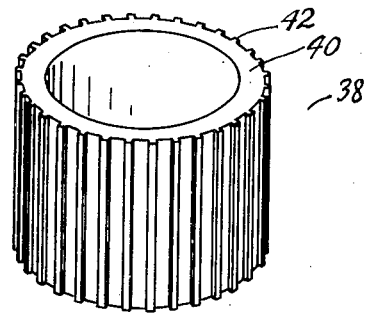
Fig. 2 is a perspective view of a tool employed to keep the coils out of the entrances of the winding slots until the coils are hardened.
Figure 3:
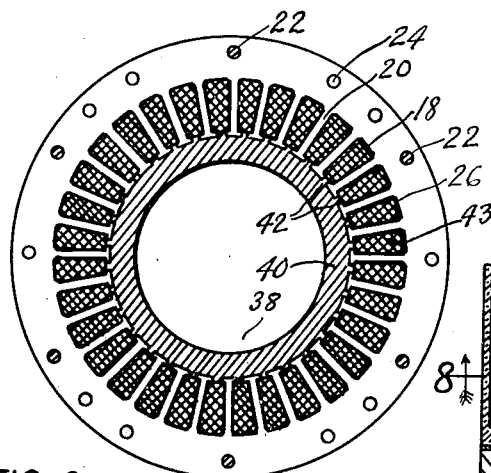
Fig. 3 is a transverse section through the core and coils assembly with the tool Fig. 2 inserted, in which condition the coils are hardened.

Before the fluid insulation in the coils is hardened the tool 38 shown in Fig. 2 is preferably inserted. Tool 38 comprises a hollow cylinder 40 with a series of keys 42 which in size, spacing and number, correspond to the narrow entrances of the winding slots 18 through which the coil sides 43 are threaded. The transverse section Fig. 3 shows the tool 38 inserted, and in this condition the impregnating fluid in the coils is hardened. After the winding is rigid the tool 38 is withdrawn and the core and coils assembly is ready to have the protective casing of insulating material pressure molded around the core and windings.

To mold the protective casing of insulation around the core 10 and its windings, the mold 44 Fig. 4 is provided, and, in order that the protective casing may be molded completely around the coils and around the outside of the core, a special core supporting means to hold the core suspended in the mold cavity is incorporated in the mold. The body of the mold is in three sections comprising a base 46, a middle section 48, a stock ring 50, and a plunger 52. The special core supporting means is secured to the base 46.

The core supporting means comprises the collars 54, 56, 58, the top plate 60, the jaws 62, the center shaft 64 and the wrench 66. The collar 54 is secured to the base 46 by screws 68. Other screws 70 secure the collars 54 and 56 and the top plate 60 together, leaving the collar 58 free to revolve in the enclosure thus formed. Collar 58 is keyed to the center shaft 64 by the key 72. The center shaft 64 is adapted to be revolved by the wrench 66 through bevel gear 74 and pinion 76. The bevel gear 74 and the pinion 76 are integral parts of the shaft and wrench respectively.

The upper surface of the collar 54 and the lower surface of the top plate 60 each have a series of radial grooves 78 within which the jaws 62 may slide freely. (See enlarged view Fig. 6.) Both top and bottom surfaces of the collar 58 have a scroll 80 cut therein and the jaws 62 each have a series of transverse projections extending into these scrolls. When the wrench 66 is turned in one direction the collar 58 revolves and the jaws 62, through the scrolls 80, move inwardly, and when the wrench is turned oppositely the jaws 62 move outwardly.

The collar 56 fits the inner diameter of the core 10 snugly but not tightly, and the jaws 62 are made thinner where they pass over the ends of the collar. The outer ends of the jaws extend very slightly beyond the outer diameter of the collar 56 and so hold the core from upward or downward movement on the collar, and consequently from upward or downward movement in the mold. Special screws 81 extend through the core 10 to temporarily close several of the holes 24. Screws 81 are withdrawn from the core after molding is effected.

In practice the core and coils assembly with the coils insulation-treated and hardened is placed in the stock ring 50 with screws 82 inserted to hold the winding terminals 34 in position. The middle section 48 is then put in place around the core 10. A ring 84, preferably of sheet metal is inserted in the base 46 after which the base 46 is brought up to the middle section 48 and the bolts 86 are put in to secure the several sections together. The ring 84 is preferably roughened on the inside diameter, or it may have a series of holes through it in order that the insulation composing the protective casing which is afterward molded within it will bind it in place and make it a part of and reinforcement for the protective casing. Before the plunger 52 is entered, the core 10 may be raised or lowered slightly, as necessary, by reaching through the plunger opening to bring the ends of the core level with the ends of the collar 56 whereupon the wrench 66 may be turned and the jaws moved radially outward until the ends of the jaws extend slightly past the ends of the collar 56 over the ends of core 10, so that thereafter core 10 may not move upwardly or downwardly in the mold. When the core and coils assembly is thus suspended in the mold there is a continuous space 88 around the outside and ends of the core and around the coil heads.

A slug 90 containing a proper volume of the encasing insulation is now laid in the opening in the stock ring 50 and the plunger 52 is inserted and pressed downward to the position shown in Fig. 5.

From Fig. 5 it will be seen that the insulation has been compressed into the space 88, Fig. 4 to form a protective casing which completely surrounds and encloses the coil heads as at 89, Fig. 5, and which completely surrounds the outside of the core as at 91, the ends as at 93 and the inside of the core except where the inner faces 87 of the core teeth 20, (see Fig. 7), rest against the collar 56, and except for the slight indentations at the ends of the core where the ends of the jaws 62 rest against the ends of the core. The insulation also fills the narrow entrances of the winding slots 18 left vacant when tool 38 was withdrawn after the coils were hardened, thus completely covering the coil sides 43 as at 95. The insulation also fills the holes 24 except several that have the insulation excluded by the screws 81 thus forming rivets of insulation as at 97 which help to bind the parts of the mass at opposite ends of the core together.

After the protective casing of insulation has been formed the structure is removed from the mold 44. This process consists in first turning the wrench 66 to move the jaws 62 radially inward, then removing the screws 82 and 86 then pulling apart the sections 46, 48 and 50 by holding fast to one of the grooves 92 and pulling on another. A stripper ring 94 may be made available to assist in removing the finished stator from the base of the mold by removing the screws 96 and pushing the ring upwardly by reaching through holes 99 extending through the bottom of the base to the bottom of the ring.

Figure 7:
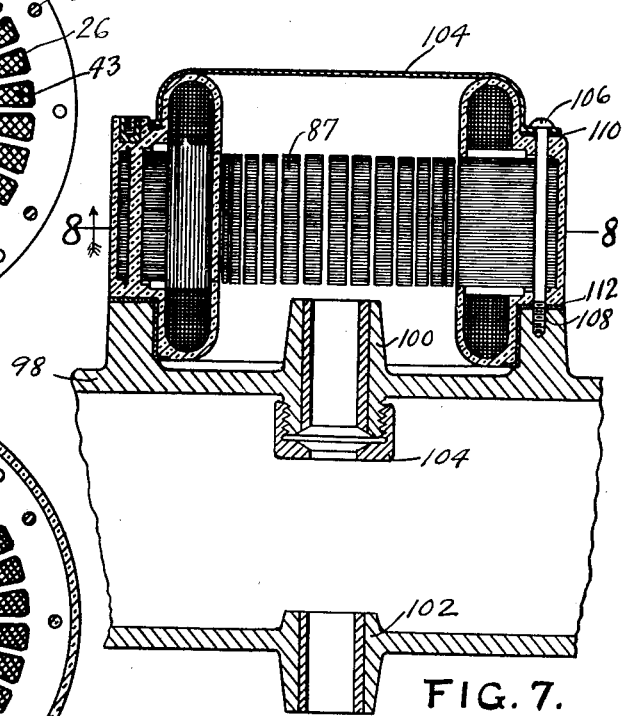
Fig. 7 shows the stator assembled with parts which close the ends.

In Fig. 7 is shown the completed stator mounted on the frame 98 of a machine which is to be motor driven. Bearing hubs 100 and 102 are part of the machine and are concentric with the stator so that if a shaft is rotatably supported in the bearings it may extend through the bearing into the stator and support a rotor on its outer end. A packing nut 104 on the end of the bearing hub 100 keeps foreign matter from the interior of the motor. The shaft and the rotor are omitted, for clearness, since they form no part of the invention.

Figure 8:
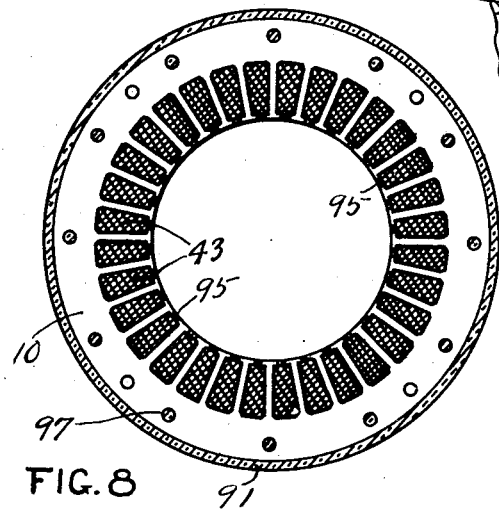
Fig. 8 is a transverse section taken at 8—8 of Fig. 7.

The upper end of the stator is closed by the cover 104. Long screws 106 extend through the cover, through the holes 24 left vacant in core 10 by withdrawal of the screws 81 of mold 44 and into the machine frame at 108 to hold the several parts together. Gaskets 110 and 112 make tight joints between the cover 104 and the stator and between the stator and the frame 98. The transverse section Fig. 8 shows how the coil sides 43 are covered by the insulation as at 95, how rivets of insulation 97 extend through holes 24 in the core 10 and how core 10 is completely surrounded by the protective casing 91.

Having described an embodiment of my invention, I claim,

1. A dynamo electric machine element comprising a magnetizable core having a central opening with a plurality of winding slots surrounding said opening, core teeth extending inwardly between said slots to said opening, a winding comprising coils with coil sides in said slots and coil heads at the ends of the core, metal terminals for said winding, and a single mass of insulation completely surrounding and covering the coil heads, the coil sides, the metal terminals and the core, except the inner end surfaces of the core teeth and the end surfaces of the metal terminals which are exposed at the surfaces of said mass.

2. A dynamo electric machine element comprising a hollow core having a central opening with a plurality of winding slots extending radially outward from said opening, core teeth extending inwardly between said slots to said opening, a winding comprising coils with coil sides in said slots and coil heads at the ends of the core, and a protective casing comprising a one piece layer of insulation completely covering the core and coils both outside and inside of the structure except that the inner ends of the core teeth extend through the casing into the said central opening.

VINCENT G. APPLE.